Jan. 6, 1970   D. DOWNES   3,488,410
PROCESS FOR MOLDING RESISTORS
Filed Sept. 7, 1966   2 Sheets-Sheet 1

INVENTOR
DOUGLAS DOWNES

BY *Paris, Haskell & Levine*
ATTORNEYS

United States Patent Office 3,488,410
Patented Jan. 6, 1970

3,488,410
PROCESS FOR MOLDING RESISTORS
Douglas Downes, Framingham, Mass., assignor to Ace Electronics Associates, Inc., a corporation of Massachusetts
Filed Sept. 7, 1966, Ser. No. 577,655
Int. Cl. B29d 3/00; B29c 1/02
U.S. Cl. 264—24                                  4 Claims

ABSTRACT OF THE DISCLOSURE

The specification discloses the fabrication of resistors for potentiometers molded from a mixture of phenol aldehyde resin and carbon black. The molding is effected in the presence of a selected magnetic field pattern, which controls the resistivity pattern and/or the uniformity of unit resistivity of the resistors.

---

The present invention relates to the manufacture of potentiometers, and particularly to the manufacture of molded resistance units for use in potentiometers.

In general, the type of potentiometer to which the present invention relates comprises a resistance track formed from a mixture of a conductive powder, such as carbon black, with a thermosetting resin, such as phenol formaldehyde. The track may be rectilinear or circular, and is provided with electrical terminals at its ends. To complete the potentiometer, the resistance track is mounted on an insulating base, and is provided with a wiper or variable tap.

The resistance track is, of course, formed in a molding operation, wherein in the case of a thermosetting resin the resin-carbon mixture is set to a hardened and fixed shape. It is usual in this operation to co-mold a base with the resistance track by overlaying the resistance material in the mold with a charge of insulating resin, preferably of the same type as that with which the resistance material is formed, but without any conductive powder admixed therewith.

One of the problems attendant the manufacture of this type of potentiometer is the difficulty of obtaining uniformity, i.e., uniform unit resistivity, along the length of the molded resistance track. This problem of uniformity applies both to linear resistance potentiometers as well as to nonlinear function potentiometers; i.e., the resistance track may be designed to have a varying cross-section along its length to provide a nonlinear function, or it may be designed to have a uniform cross-section along its length to form a linear unit. In either event, nonuniformity usually results from the fact that the unit resistivity varies somewhat in various areas of the resistance track. It is therefore intended herein to distinguish between the designed nonlinearity of a particular unit, and the undesired nonuniformity that appears in the function designed into the unit.

Nonuniformity that appears in these molded units is usually corrected by shaving or trimming appropriate amounts of resistance material from the molded resistance tracks until the desired uniformity tolerances are obtained. This at best is an expensive process, and also suffers from the disadvantage that only a limited amount of resistance material can be removed without so altering the overall resistance or resistance change per unit length as to render the unit useless for its contemplated purpose. Thus, if the nonuniformity as molded is too great, it may be that the unit cannot be effectively corrected to desired tolerances.

The principal purpose of the present invention is to improve the uniformity of these conductive resin resistors as molded, so that either no trimming of the resistance material is necessary, or such trimming as may be required for ultra high precision units is greatly reduced. To this end it has been discovered that the unit resistivity of these molded resistors is a function of the magnetic field to which the unit is subject during the molding operation. To some extent the magnetic field affects the conductive powder, such as carbon black, because there usually are some magnetically susceptible impurities in the carbon. However, this effect is only incidental and minor, and it is found that the primary effect of the magnetic field is on the resin itself. It is believed that this effect results from the oxygen atoms in the molecular structure of the resin, which appear both to be magnetically susceptible and to play a significant role in the transfer of electrical energy between carbon particles.

Thus, it has been found that if the resistance unit is molded while subjected to a uniform strong magnetic field, the resultant unit has a much greater uniformity than is obtained in the absence of the magnetic field. For example, using carbon black and phenol formaldehyde, it has been observed that using a steel mold, in the absence of any imposed magnetic field, irregular deviations from uniformity of resistivity ranging from about 0.9 of one percent to 1.1 percent are usually obtained in the molded potentiometer. Using an aluminum mold, again in the absence of any imposed magnetic field, deviations from uniformity of resistivity ranging from about 0.3 to 0.4 of one percent are obtained. While using an aluminum mold, and imposing a strong uniform magnetic field over the area of the resistance track while it is being molded, uniformity deviations of resistivity of only between about 0.1 to about 0.27 of one percent are obtained. Since steel is a magnetically susceptible material, it is thought that the improvement obtained with an aluminum mold over a steel mold results from stray, irregular, and unpredictable magnetic fields present in the steel mold. It will be seen that still further important improvements in uniformity are obtained when the aluminum mold is used and the resistance track is subject to an imposed strong uniform magnetic field during the molding operation. Once the resin is set, it does not appear that any feasible magnetic field can change the characteristics of the track. It is therefore important that the magnetic field be applied while the resin is in the fluid state that occurs when the resin is heated to set and cure it, and that the field be maintained until the resin is converted to its hardened thermoset state.

Although uniformity is the primary purpose of the present invention, since it is found that conductivity or resistivity of the molded resistance material is a function of imposed magnetic field, one can utilize this phenomenon to induce nonlinearity into the resistance unit by applying different magnetic fields along its length during the molding operation. And this feature is an additional aspect of the present invention. This programmed nonlinearity is, as explained above, quite different from nonuniformity; and indeed, by maintaining different but constant magnetic fields along the length of the resistance unit while it is being molded, the above-described uniformity will be observed within the nonlinear functions. Other and various effects can thus be produced. For example, one can orient the oxygen atoms of the resin in a portion of the resistance material by applying a strong continuous magnetic field, and immediately adjacent thereto completely disorient the oxygen atoms by applying an alternating high frequency magnetic flux field to that area.

Accordingly, it is one object of the present invention to provide improved uniformity in the resistivity of molded potentiometer resistance units.

Another object of the present invention is to provide for such improved uniformity by the application of magnetic fields to the molding material as it is molded.

Still another object of the present invention is to provide for improved uniformity in the resistivity of potentiometer resistance units formed from mixtures of nonmagnetic conductive particles and a resin.

And another object of the present invention is to provide for improved uniformity in the resistivity of potentiometer resistance units formed from mixtures of nonmagnetic conductive particles and magnetically susceptible resins.

A still further object of the present invention is to provide for the introduction of nonlinear functions in molded conductive resin potentiometer resistance units by the application of magnetic fields to the units during the molding operation, particularly with such units formed from mixtures of nonmagnetic conductive particles and magnetically susceptible resins.

Other objects and advantages of the present invention will become apparent to those skilled in the art from a consideration of the following detailed description of the invention, had in conjunction with the accompanying drawings wherein like numerals refer to like or corresponding parts, and wherein.

Figure 1:
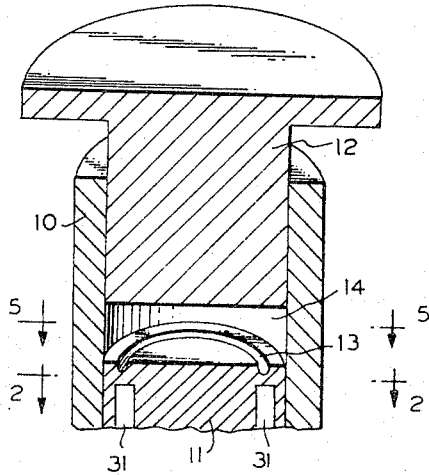
FIG. 1 is a vertical sectional and partial perspective view of a mold employed in fabricating one form of resistor in accordance with the present invention.

For purposes of illustration, the form of the resistance unit described in this specification is chosen to be a raised annular track mounted on a circular base, so as to be adapted for use in a rotary type potentiometer or rheostat. Accordingly a representative type of mold for forming the unit is shown in FIG. 1. The mold comprises an annular sleeve 10 housing a bottom or base member 11, defining a molding cavity 14 thereabove. Base member 11 has an arcuate recess 13 therein for defining the resistance track. A plunger 12 is axially slidably received in the cavity 14. When the mold cavity is appropriately charged with a thermosetting plastic molding composition and the plunger 12 is positioned on top thereof, the charged mold is placed between a pair of heated pressure platens acting to compress the charge through the plunger 12 and heat cure the same, all as fully understood by those skilled in the art.

Figure 3:
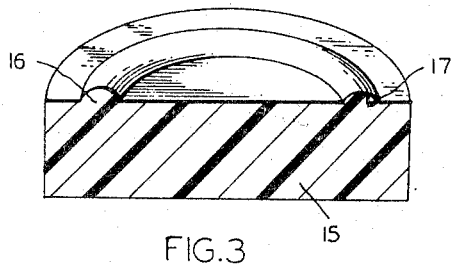
FIG. 3 is a cross-sectional and partial perspective view of a plastic resistor fabricated from the mold of FIG. 1 in accordance with the present invention.

To produce a potentiometer resistance unit, the resistance element is formed on the mold base element 11 by depositing in track 13 a fluid solution of a thermosetting resin such as phenol aldehyde and solvent therefor, having conductive particles such as carbon black homogeneously admixed therewith. This deposited layer is then dried of solvent and partially cured by heating at about 300° F. for 20 minutes. The mold base element 11 with the partially cured resin-carbon layer is then inserted in sleeve 10, surcharged with a desired quantity of nonconductive thermosetting resin molding powder, such as phenol aldehyde, and then the combined charge is comolded and fully cured under heat and pressure between base 11 and plunger 12 in a suitable press. The resultant resistance unit is shown in FIG. 3, having a conductive resistance layer 17 on the surface of ridge 16, carried by the insulating resin base 15.

The foregoing procedure is one exemplary method described in the prior art for forming a molded potentiometer resistance track, and is further described and illustrated in greater detail in U.S. Patent 3,239,789, issued Mar. 8, 1966 to Daniel N. Shaheen, and assigned to the assignee of the present invention. The present invention is illustrated as applied to this procedure for forming the molded resistance unit, but it is understood that it is likewise applicable to other procedures.

Figure 2:
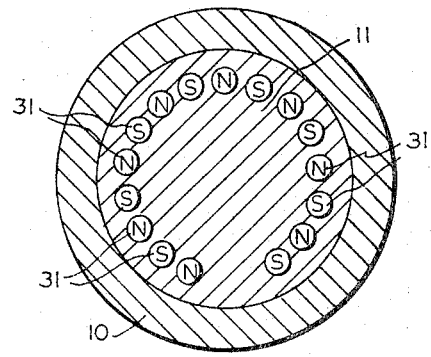
FIG. 2 is a cross-sectional view of the mold taken along the line 2—2 of FIG. 1.

In accordance with the preferred embodiment of the present invention the entire mold, including sleeve 10, base 11, and plunger 12 is made of a nonmagnetic material, such as aluminum, and a series of equal strength bar magnets 31 are inserted in the base 11 so that one pole piece of each bar magnet 31 underlies the molding track 13. As shown in FIG. 2, these bar magnets are closely and uniformly spaced from each other under the molding track 13, and alternate in polarity orientation. By this arrangement, the area of the molding track 13 is subjected to a uniform magnetic field along its length during the molding operation. As stated above, the presence of the uniform magnetic field affords a substantially increased uniformity to the unit resistivity along the molded resistance track 17. Obviously the number, spacing and strength of the magnets 31 is a matter of design related to the size and dimensions of the mold; however, it is found for example that a uniform field of approximately 8000 gauss is effective to obtain the beneficial effects of the present invention.

The location of the magnets 31 in a circular configuration under the molding track 13 is selected as a convenient mode of obtaining the desired uniform magnetic field. Obviously, other configurations are possible. For example, the bar magnets might be inserted in a radial orientation around the sleeve 10; or a single electromagnetic toroid or a circularly configured magnet might be placed under the molding track 13. All such configurations are adapted to expose the track 13 to a uniform magnetic field.

Since the mold is usually heated by means of electric heaters during the molding operation, it is desirable to include a magnetic field shield between the heaters and the mold, so as to shield the resistance units from any effect of the magnetic field generated by the heaters.

By way of comparison, to illustrate the effects of the present invention, two potentiometer resistance tracks, comprising carbon black and one step thermosetting phenol aldehyde resin, were molded in the same mold and under the same conditions, following the procedures outlined above and explained in greater detail in said Shaheen patent. In one instance the compression and thermosetting phase of the molding was effected in the presence of a uniform magnetic field of 8000 gauss using the mold shown in the accompanying drawing. In the other instance, the same mold was employed, except the magnets 31 were removed. The unit produced in the uniform magnetic field had a maximum deviation from uniformity of only .13%, while the other unit had a maximum deviation from uniformity of 1.72%.

Figure 5A:
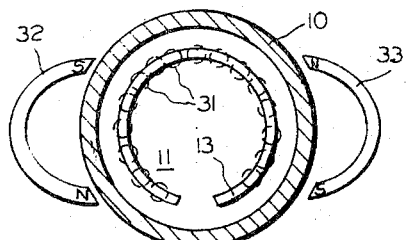
FIGS. 5A and 5B are cross-sectional views of the mold taken along the line 5—5 of FIG. 1, and showing modified procedures of the present invention.
Figure 5B:
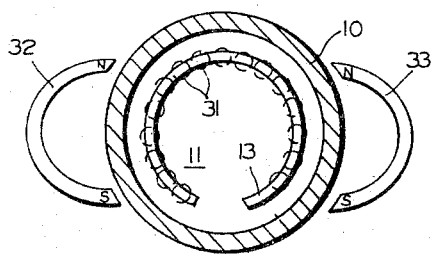

Since the resistivity of the molded resistance unit is affected by a magnetic field, it is an additional feature of the present invention to utilize this phenomenon to induce nonlinear functions into the unit. One mode of accomplishing this result is illustrated in FIGS. 5A and 5B. As there illustrated, the mold base 11 is again provided with the bar magnets 31 to afford the desired uniformity of unit resistivity as a point of departure. This uniformity is then subjected to a perturbation by the application of one or more interfering or modifying magnetic fields. For purposes of illustration, in FIGS. 5A and 5B the magnetic field perturbations are shown as effected by the positioning of two horseshoe magnets 32 and 33 about the periphery of the mold sleeve 10. Obviously the perturbing fields could be introduced by placing the magnets 32 and 33 in other configurations, or by using other magnet configurations, or by altering the bar magnets 31, depending on the perturbing influence desired.

Figure 6:
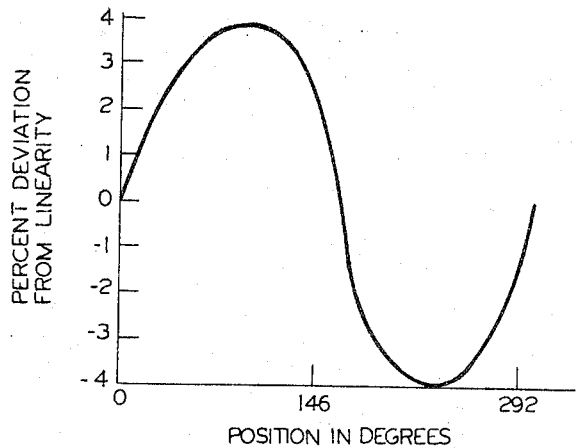
FIGS. 6, 7 and 8 are graphic plots of nonlinear functions introduced into molded resistance units produced in molds illustrated by FIGS. 5A and 5B.
Figure 7:
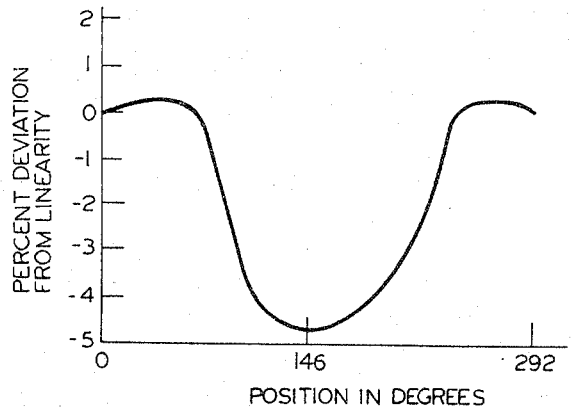
Figure 8:
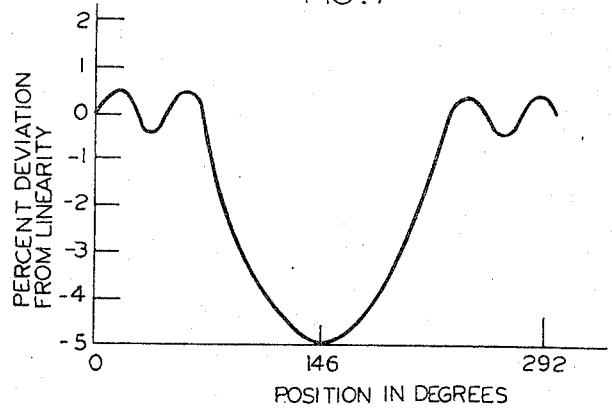

For purposes of example, selected nonlinear functions produced by the horseshoe magnet perturbances are schematically illustrated in the graphs of FIGS. 6, 7 and 8, wherein the percent deviation from linearity of unit resistivity is plotted against position along the resistance track 17, expressed in degrees of the arc defined by the track, using a uniform magnetic field from bar magnets 31 of 8000 gauss, and perturbing fields of 8000 gauss for each of the horseshoe magnets 32 and 33. The curve in FIG. 6 was obtained using an all aluminum mold, and a perturbing field from the horseshoe magnets 32 and 33 was obtained from the configuration shown in FIG. 5A. The curve in FIG. 7 was obtained again using the horseshoe magnet configuration of FIG. 5A, but substituting a steel sleeve for the aluminum sleeve 10 in the mold. FIG. 8 shows the results obtained when the horseshoe magnet configuration is altered to that of FIG. 5B, and the steel sleeve is used in place of the aluminum sleeve 10 of the mold.

Figure 4:
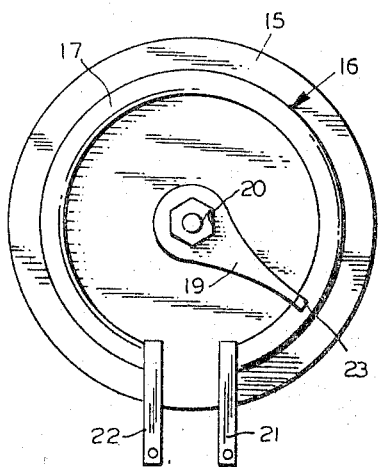
FIG. 4 is a molded plastic resistor formed into a potentiometer in accordance with the principles of the present invention.

Since the primary purpose of the present invention is to provide resistance units for use in potentiometers and rheostats, a resistance unit of the present invention embodied in a potentiometer is shown in FIG. 4. The resistance unit comprises the integrally molded insulating or nonconductive base 15 with the current carrying resistor 17 thereon. The ends of the resistor 17 are terminated in appropriate terminals 21 and 22. An aperture in base 15 on the center of the resistor arc mounts a shaft 20 carrying wiper 19 having the contact element 23. Rotation of shaft 20 causes contact element 23 to traverse the surface 17 of the resistor, and the contact 23 thus affords a variable tap for the potential applied across the resistor through terminals 21 and 22.

It will thus be appreciated from the above described specific examples of the invention, that there is provided a method of manufacturing molded resistor units for potentiometer and rheostat use, having improved uniformity of resistivity and controlled nonlinearity, effected by the appropriate use of magnetic fields during the molding of the resistors. These examples are obviously only illustrative of the invention, and numerous variations and modifications will be apparent to those skilled in the art.

What is claimed is:

1. In the method of forming elongate plastic resistance units for potentiometers, comprising depositing in a mold having a shape approximating that desired for the unit a layer of a fluid mixture consisting essentially of a magnetically susceptible thermosetting resin in a solvent therefor having essentially nonmagnetic powdered conductive material homogeneously admixed therewith, drying said layer by evaporating the solvent at a temperature below that which effects a complete cure of the resin, and molding said dried layer under curing pressure and temperature and for a time sufficient to fluidify and then to thermoset it to a hardened state; the improvement wherein said molding step is effected in the presence of a magnetic field applied to said layer in a controlled predetermined pattern from a time in said molding operation when said resin is fluid and continuing until said resin is hardened, to control the unit resistivity pattern of the resistance units.

2. In the method of claim 1, said magnetic field being applied in a substantially uniform pattern over the extent of said layer.

3. In the method of claim 1, said magnetic field being applied nonuniformly over the extent of said layer in a predetermined pattern.

4. In the method of claim 1, said conductive material being carbon and said resin being a phenol aldehyde.

References Cited

UNITED STATES PATENTS

| | | | |
|---|---|---|---|
| 2,848,748 | 8/1958 | Crump | 264—24 |
| 2,849,312 | 8/1958 | Peterman | 75—201 |
| 2,964,793 | 12/1960 | Bume | 18—47.5 |
| 3,239,788 | 3/1966 | Norman | 264—105 |
| 3,359,145 | 12/1967 | Sayler | 156—1 |

ROBERT F. WHITE, Primary Examiner

RICHARD R. KUCIA, Assistant Examiner

U.S. Cl. X.R.

264—105